US008700594B2

(12) United States Patent
Apacible et al.

(10) Patent No.: US 8,700,594 B2
(45) Date of Patent: Apr. 15, 2014

(54) ENABLING MULTIDIMENSIONAL SEARCH ON NON-PC DEVICES

(75) Inventors: Johnson Apacible, Mercer Island, WA (US); Mark Encarnacion, Issaquah, WA (US); Aleksey Sinyagin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 13/117,749

(22) Filed: May 27, 2011

(65) Prior Publication Data

US 2012/0303664 A1 Nov. 29, 2012

(51) Int. Cl.
*G06F 17/30* (2006.01)
*G06F 3/16* (2006.01)
*G10L 21/00* (2013.01)

(52) U.S. Cl.
USPC ........... 707/706; 707/769; 707/736; 715/716; 715/728; 715/738; 715/825; 704/275

(58) Field of Classification Search
USPC ......... 707/802, 803, 706, 769, 736, 771, 778; 704/275; 715/716, 728, 738, 825, 719, 715/727, 764, 810, 817, 819, 820, 828, 829
See application file for complete search history.

(56) References Cited

U.S. PATENT DOCUMENTS

| 7,730,059 B2 | 6/2010 | Behnen et al. | |
|---|---|---|---|
| 7,739,221 B2 | 6/2010 | Lawler et al. | |
| 7,873,901 B2 | 1/2011 | Chen et al. | |
| 7,983,915 B2 * | 7/2011 | Knight et al. | 704/254 |
| 8,126,714 B2 * | 2/2012 | Hanazawa et al. | 704/257 |
| 8,296,383 B2 * | 10/2012 | Lindahl | 709/206 |
| 8,355,919 B2 * | 1/2013 | Silverman et al. | 704/260 |
| 2004/0095400 A1 | 5/2004 | Anderson et al. | |
| 2008/0066135 A1 | 3/2008 | Brodersen et al. | |
| 2012/0016678 A1 * | 1/2012 | Gruber et al. | 704/275 |
| 2012/0036153 A1 * | 2/2012 | Lee et al. | 707/770 |

OTHER PUBLICATIONS

Marti A. Hearst, "'Natural' Search User Interfaces", Communications of the ACM, vol. 54, Issue 11, Nov. 2011, pp. 60-67.*
Apple Inc., "iPhone User Guide for iOS7", Oct. 2013, pp. 1-158, www.apple.com/ios/siri.*
Jones, et al., "Improving web search on small screen devices", Retrieved at <<http://citeseer.ist.psu.edu/view/doc/download:jsessionid=81D6886B670C3FE0C20E6B6ADD0838F0?doi=10.1.1.150.1745&rep=rep1&type=pdf>>, Interacting with Computers, vol. 15, Issue 04, Aug. 1, 2003, pp. 479-495, Elsevier B.V., UK.

(Continued)

*Primary Examiner* — Cheryl Lewis
(74) *Attorney, Agent, or Firm* — Dan Choi; Carole Boelitz; Micky Minhas

(57) ABSTRACT

Multidimensional search capabilities are enabled on a non-PC (personal computer) device being utilized by a user. An original query submitted by the user via the non-PC device is received. A structured data repository is accessed to extract structured data that is available for the original query, where the extracted structured data represents attributes of the original query. The extracted structured data is provided to the user in the form of a hierarchical menu which allows the user to interactively modify the original query, such modification resulting in a revised query.

18 Claims, 7 Drawing Sheets

(56) References Cited

OTHER PUBLICATIONS

Arias, et al., "Context-Based Personalization for Mobile Web Search", Retrieved at <<http://citeseerx.ist.psu.edu/viewdoc/download?doi=10.1.1.144.3749&rep=rep1&type=pdf>>, Very Large Data Bases (VLDB) '08, Aug. 24-30, 2008, pp. 7, Association for Computing Machinery (ACM), Auckland, New Zealand.

""Inter-Xect," the 5 in 1 Multi Dimensional Search Engine by T&C Vectors Inc. is Now Free for individuals", Retrieved at <<http://www.prweb.com/pdfdownload/5022044.pdf>>, Feb. 2, 2011, pp. 3.

"Google Search for mobile", Retrieved at <<http://www.google.com/mobile/Search/>>, Retrieved Date: May 6, 2011, pp. 2.

* cited by examiner

ENABLING MULTIDIMENSIONAL SEARCH ON NON-PC DEVICES

BACKGROUND

The Internet is a global data communications system that serves billions of users worldwide. The Internet provides users access to a vast array of online information resources and services, including those provided by the World Wide Web, intranet-based enterprises, and the like. Search engines generally provide the ability to search for online information on a specific computing device or on a network such as the Internet or a private network. Thanks to the ubiquity of personal computing devices, the Internet and the World Wide Web, users routinely submit queries to search engines to locate particular online information they are interested in. This information of interest may be either online information that the users have visited/viewed before, or new online information that the users have not yet visited/viewed. The search results displayed to the users may include a wide variety of different types of online information such as websites or particular web pages therein, documents, images, audio, video, and other types of files and information. Many different search engines exist today which vie for popularity.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Multidimensional search technique embodiments described herein generally involve enabling multidimensional search capabilities on a non-PC (personal computer) device being utilized by a user. In an exemplary embodiment an original query submitted by the user via the non-PC device is received. A structured data repository is accessed to extract structured data that is available for the original query, where the extracted structured data represents attributes of the original query. The extracted structured data is provided to the user in the form of a hierarchical menu which allows the user to interactively modify the original query, such modification resulting in a revised query.

DESCRIPTION OF THE DRAWINGS

The specific features, aspects, and advantages of the multidimensional search technique embodiments described herein will become better understood with regard to the following description, appended claims, and accompanying drawings where:

DETAILED DESCRIPTION

Figure 1:
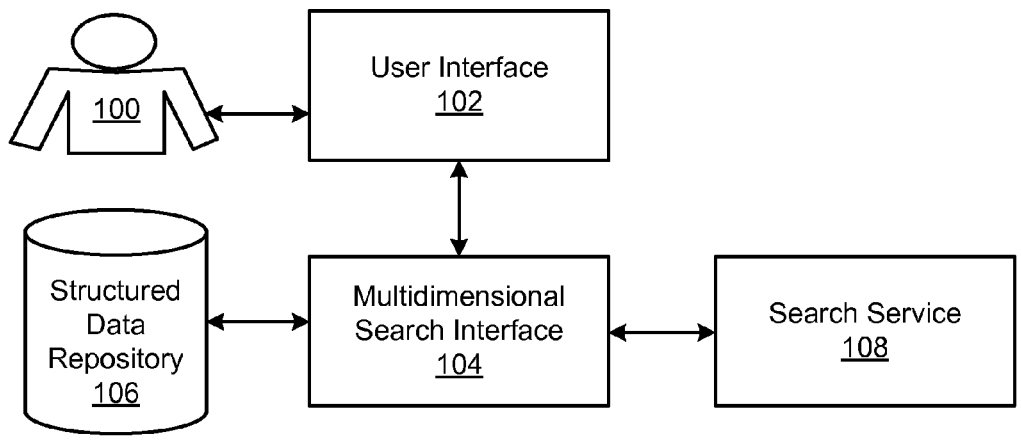
FIG. 1 is a diagram illustrating an exemplary embodiment, in simplified form, of an architectural framework for implementing the multidimensional search technique embodiments described herein.

In the following description of multidimensional search technique embodiments reference is made to the accompanying drawings which form a part hereof, and in which are shown, by way of illustration, specific embodiments in which the multidimensional search technique can be practiced. It is understood that other embodiments can be utilized and structural changes can be made without departing from the scope of the multidimensional search technique embodiments.

The term "online information" is used herein to refer to any type of information that is accessible via a data communications network such as the Internet or a private network. Exemplary types of online information include, but are not limited to, an image, a video clip, an audio clip, a document (which can include text in combination with one or more of these information types), and a web page (which can include an interrelated collection of one or more of these information types). The term "site" is used herein to refer to a collection of related items of online information. A website is just one example of a site that includes a collection of related web pages and other types of online information. The term "non-PC device" is used herein to refer to a computing device that is utilized by a user, connects to a local area and/or wide area network, can run various computing applications (such as personal computing applications, gaming applications, and applications which enable Internet access, among others), and is implemented in a form other than a conventional desktop personal computer (PC) or laptop PC. Exemplary non-PC devices include, but are not limited to, a conventional smartphone, a conventional tablet computer, a conventional personal digital assistant (PDA) device, a conventional three-dimensional (3D) television system, a conventional 3D heads-up display system (e.g., head-worn display system), and a conventional video game console which can be connected to a conventional two-dimensional (2D) display device (such as a 2D display monitor, or a 2D television, among others) or another type of display device. Exemplary video game consoles include the Wii™ (a trademark of Nintendo), the PlayStation® (a registered trademark of Sony Computer Entertainment Inc.), and the Xbox® (a registered trademark of Microsoft Corporation). Desktop PCs, laptop PCs and the like are hereafter simply referred to as "PC devices."

1.0 Online Information Search

As described heretofore, a user can submit a query to a conventional search engine to locate particular online information he is interested in. As is appreciated in the arts of computing, the Internet and the World Wide Web, these information searches can be performed within various realms such as a specific computing device, or a specific site, or a specific enterprise intranet, or the World Wide Web, among others. These information searches can also be web searches, social searches, twitter searches, and the like. These information searches can also be initiated by the users from various types of computing devices such as a PC device or any of the aforementioned types of non-PC devices, among others.

By way of example but not limitation, a given user who is utilizing a PC device and is interested in particular online information can submit a query to a given search engine and the search engine can subsequently provide the user with search results in the following manner. The user can utilize a browser application running on the PC device to submit a query which includes one or more query keywords (hereafter referred to as "query terms") that the user associates with particular online information he is interested in. More particularly, the user can utilize the PC device's keyboard to manually enter the text associated with the query terms into a search box of the browser application. Upon receiving the query, the search engine searches one of the aforementioned realms and identifies items of online information therein that it determines to be related to the query. The search engine then transmits search results for the query to the browser application. The search results generally include a ranked list of one or more items of online information each of which are identified by a different information link (such as a Uniform Resource Locator (URL) or the like). In other words, each information link specifies where a given item of online information is located (such as its Internet location or the like), and provides a mechanism for retrieving the item.

Upon receiving the search results, the browser application displays them to the user. Upon viewing the search results, the user can do various things. By way of example but not limitation, the user can utilize the PC device's mouse or another like pointing device to select (e.g., click on) a given information link in the search results in order to view additional content of the particular item of online information that is associated with the link. Generally speaking, the user can also refine the search results by providing the search engine with more context and explicit intent. More particularly, the user can again utilize the PC device's keyboard to modify the query by either deleting one or more of the previously entered query terms, or entering one or more additional query terms into the search box of the browser application, or entering a disambiguating phrase (i.e., two or more query terms that are intended by the user to disambiguate the query) into the search box, or any combination thereof.

As is also appreciated in the arts of computing, the Internet and the World Wide Web, the popularity of non-PC devices is increasing rapidly. There are many reasons for this including, but not limited to, the following. Non-PC devices are full-fledged computing and communications devices. Furthermore, non-PC devices such as smartphones, tablet computers, and PDA devices allow their users to be mobile while such devices are being utilized. Yet furthermore, cloud-based services are emerging that reduce computing overhead on non-PC devices. As a result, users are spending an increasing amount of time utilizing non-PC devices for their computing, online information searching and online information viewing activities. In other words, users are increasingly utilizing non-PC devices to submit queries for particular online information they are interested in, view the search results and refine the search results.

2.0 Enabling Multidimensional Search on Non-PC Devices

The multidimensional search technique embodiments described herein generally involve enabling multidimensional search capabilities on a non-PC device being utilized by a user. More particularly and as will be described in more detail hereafter, the multidimensional search technique embodiments use structured data stored within a structured data repository to enable a multidimensional search interface which allows the user to utilize the non-PC device to submit queries to a search service for particular online information he is interested in and subsequently view the search results for the queries. The structured data is generally used to determine a context for each query, and to offer the user different options for interactively disambiguating and refining the query before it is submitted to the search service. The number of dimensions provided by the multidimensional search interface and the particular manner in which this user interaction takes place are a function of the particular user interface that is supported by the user's non-PC device.

The multidimensional search technique embodiments are advantageous for various reasons including, but not limited to, the following. As will be appreciated from the more detailed description that follows, the multidimensional search technique embodiments generally make it easy for the user to utilize the non-PC device to interact with the search service. More particularly, the multidimensional search technique embodiments permit the user to efficiently and effectively submit queries to the search service for particular online information he is interested in, view the search results, and refine the search results despite the fact that the non-PC device may have a non-traditional user interface (e.g., the non-PC device may not include a conventional keyboard or mouse). The multidimensional search technique embodiments are also intuitive, and are compatible with many different types of non-PC devices including those mentioned heretofore.

2.1 Architectural Framework

FIG. 1 illustrates an exemplary embodiment, in simplified form, of an architectural framework for implementing the multidimensional search technique embodiments described herein. As exemplified in FIG. 1, the architectural framework includes a user 100, a user interface 102 of a non-PC device (not shown) which is being utilized by the user, a multidimensional search interface 104, a structured data repository 106, and a search service 108. In an exemplary embodiment of the multidimensional search technique the multidimensional search interface 104 is implemented on the non-PC device. It is noted however that alternate embodiments of the multidimensional search technique are also possible where portions of the multidimensional search interface 104 are implemented outside of the non-PC device (e.g., portions of the multidimensional search interface can be implemented on one or more other computing devices (not shown) which are logically connected to the non-PC device).

Generally speaking and referring again to FIG. 1, the user interface 102 includes one or more input devices (not shown) which are either integrated into or separately connected to the non-PC device. The user interface 102 also includes one or more output devices (not shown) which are either integrated into or separately connected to the non-PC device. It will be appreciated that the particular types of input and output devices that are employed depend upon the particular type of non-PC device being utilized by the user 100 and its configuration. As described heretofore, the non-PC device can be either a conventional smartphone, or a conventional tablet computer, or a conventional PDA device, or a conventional 3D television system, or a conventional 3D heads-up display system, or a conventional video game console which is connected to a conventional 2D display device (such as a 2D display monitor, or a 2D television, among others), or the like. As such, exemplary types of input devices include, but are not limited to, a haptic input device (such as a physical keyboard, or a mouse or other like pointing device, or a touch-sensitive display screen, or the like), an audio capture device (such as a microphone or the like), a handheld 3D remote controller device (such as the Wii remote controller that is provided with the Wii video game console, or the like), and a 3D gesture-sensing device (such as the Kinect™ (a trademark of Microsoft Corporation) that is provided with the Xbox video game console, or the like). Exemplary types of output devices include, but are not limited to, a 2D display device (such as a 2D display monitor, or a 2D television, or a touch-sensitive display screen which is integrated into smartphones, tablet computers, and PDA devices, or the like) and a 3D display device (such the display provided on 3D television systems and 3D head-up display systems, or the like). Exemplary types of input devices can also include a virtual keyboard which is simulated on either the touch-sensitive display screen or the 2D display device.

Referring again to FIG. 1, the structured data repository 106 includes data which is organized in a structured format (i.e., the structured data repository stores structured data). As is appreciated in the art of information storage, structured data is data that is organized in a structure that is identifiable, where each piece of structured data has a context (such as a meaning or a concept, among other things) assigned thereto. Thus, structured data can be described by a data model which specifies predetermined data types and relationships therebetween. Accordingly, structured data is searchable by data type. By comparison, unstructured data is data that has no identifiable structure and thus, generally cannot be described by a data model. Accordingly, unstructured data is not searchable by data type. Exemplary forms of unstructured data include bitmap objects (such as images, or video, or audio, or the like) and text objects (such as text documents, or email messages, or the like), among others. It will be appreciated that in each of such bitmap objects and text objects the data therein exists in an unstructured (e.g., "raw") format. As such, there is no context assigned to the individual pieces of unstructured data (e.g., a word by itself within a sentence or paragraph is simply a word—in order to determine the context of the word one would have to read the entire sentence or paragraph containing the word).

Figure 2:
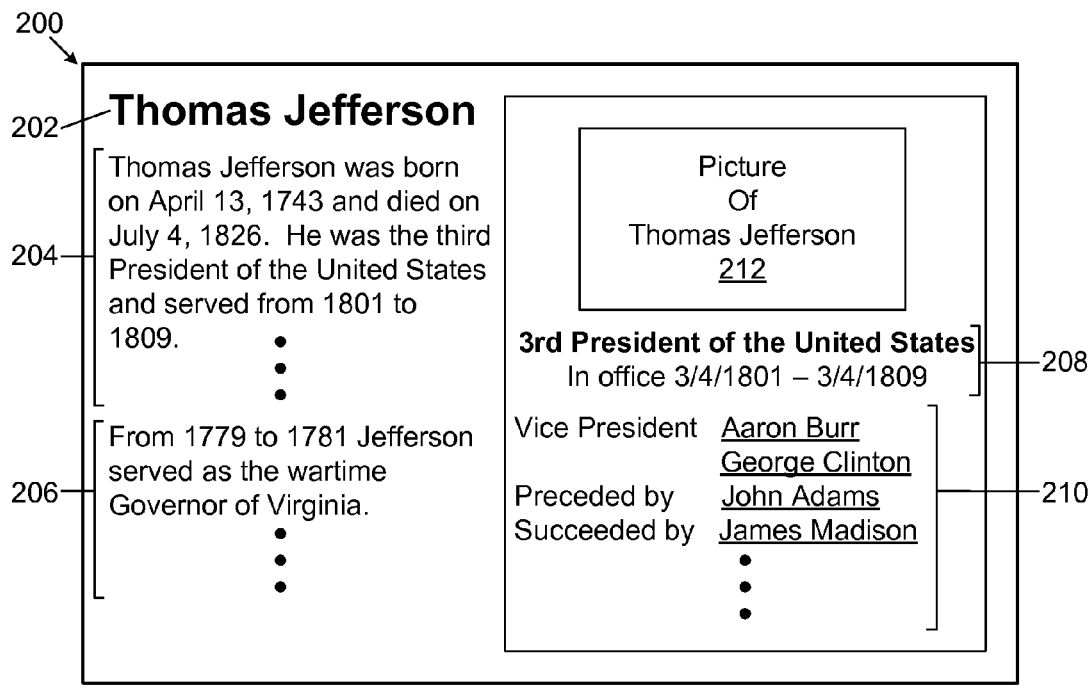
FIG. 2 is a diagram illustrating an exemplary embodiment, in simplified form, of a portion of a retrieved web page that includes both structured data and unstructured data.

FIG. 2 illustrates an exemplary embodiment, in simplified form, of a portion of a retrieved web page that includes both structured data and unstructured data. As exemplified in FIG. 2, the web page 200 includes various text objects 202-208 each of which include unstructured data. The web page 200 further includes a bitmap object 212 which also includes unstructured data. The web page 200 yet further includes a structured data object 210 which includes structured data. More particularly, within the structured data object 210 the text field "Aaron Burr" has a field heading of "Vice President"—it can thus be inferred that "Aaron Burr" was a "Vice President" for "Thomas Jefferson". The text field "George Clinton" also has a field heading of "Vice President"—it can thus be inferred that "George Clinton" was also a "Vice President" for "Thomas Jefferson". The text field "John Adams" has a field heading of "Preceded by"—it can thus be inferred that "John Adams" preceded "Thomas Jefferson" as President of the United States (i.e., "John Adams" was the second President of the United States). The text field "James Madison" has a field heading of "Succeeded by"—it can thus be inferred that "James Madison" succeeded "Thomas Jefferson" as President of the United States (i.e., "James Madison" was the fourth President of the United States).

Referring again to FIG. 1, the multidimensional search technique embodiments described herein can be implemented using various types of structured data repositories 106. By way of example, but not limitation, in one embodiment of the multidimensional search technique the structured data repository 106 is constructed by crawling one or more prescribed websites such as Wikipedia® (a registered trademark of the Wikimedia Foundation, Inc.), or Encyclopedia.com, or the like. In another embodiment of the multidimensional search technique the structured data repository 106 includes one or more online knowledge bases in which data is already organized in a structured manner. Examples of such online knowledge bases include Freebase® (a registered trademark of Google, Inc.), Wolfram|Alpha® (a registered service mark of Wolfram Group LLC) and the Internet Movie Database (IMDb®—a registered service mark of IMDb, Inc.), among others. Additional embodiments of the multidimensional search technique are also possible which use a combination of two or more different structured data repositories.

Referring again to FIG. 1 and as will be described in more detail hereafter, the multidimensional search technique embodiments described herein can also be implemented using various types of search services 108. By way of example, but not limitation, in one embodiment of the multidimensional search technique described herein the search service 108 is a conventional, general purpose search engine. Examples of such a general purpose search engine include Google, Ask, and Bing™ (a trademark of Microsoft Corporation), among others. In another embodiment of the multidimensional search technique the search service 108 is an expert knowledge search engine that is associated with a specific specialized knowledge source which includes curated data about one or more specific topics. Examples of such a specialized knowledge source include the Internet Movie Database and the amazon.com shopping catalog, among others.

Referring again to FIG. 1, the user 100 enters an original query into the user interface 102, where the original query includes one or more query terms that the user associates with particular online information he is interested in. The user can perform the original query entry in various ways including, but not limited to, the following. In one embodiment of the multidimensional search technique described herein where the user interface 102 includes either a physical keyboard or a virtual keyboard, the user can enter the original query by typing the one or more query terms into the physical or virtual keyboard, and the multidimensional search interface can simply receive the query terms as they are entered by the user. In another embodiment of the multidimensional search technique where the user interface 102 includes an audio capture device, the user can speak the one or more query terms, the audio capture device can capture the spoken query terms, and the multidimensional search interface 104 can use a conventional speech recognition application to interpret the spoken query terms and convert them to text-based query terms. In yet another embodiment of the multidimensional search technique where the user interface 102 includes an audio capture device along with either a physical or virtual keyboard, the user can utilize a combination of the keyboard and audio capture device to enter the original query.

Referring again to FIG. 1 and as will be described in more detail hereafter, once the user has completed entering the original query into the user interface 102 of the non-PC device and the multidimensional search interface 104 has received the query (or used speech recognition to interpret the spoken query and convert it to text), the multidimensional search interface accesses the structured data repository 106 to extract structured data that is available for the original query. The multidimensional search interface 104 then provides the extracted structured data to the user 100 via the user interface 102, where this data is provided to the user in the form of a hierarchical menu which allows the user to interactively modify the original query. Based on the user's 100 interactions with the extracted structured data, the multidimensional search interface 104 generates a revised query and submits the revised query to the search service 108. The multidimensional search interface 104 then receives the search results for the revised query from the search service 108 and provides the search results to the user 100 via the user interface 102. Generally speaking, the user can interact with the non-PC device (e.g., enter the original query, interact with the extracted structured data, and view and interact with the search results, among other things) in various ways based on the particular types of input and output devices that are included in the user interface 102.

2.2 Process Framework

Figure 3:
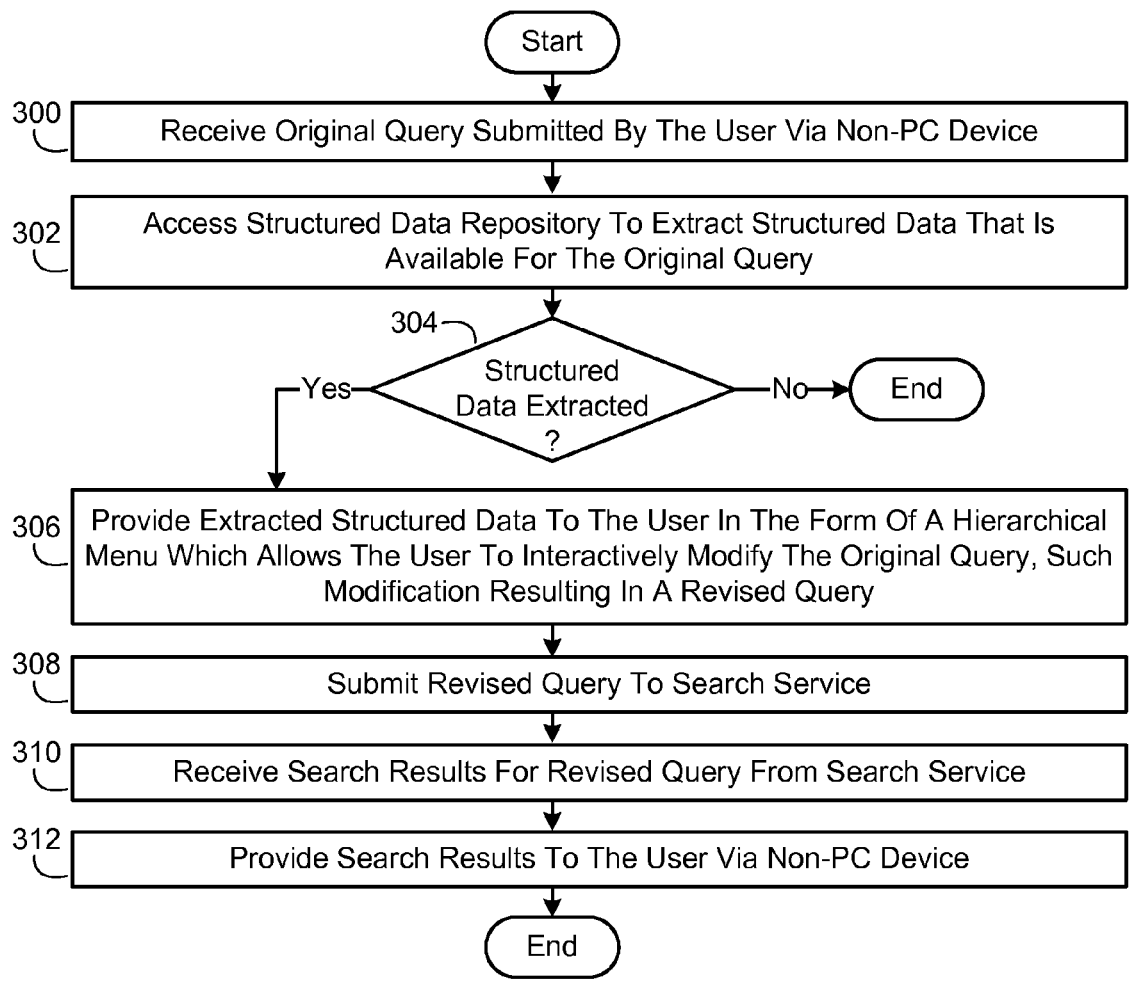
FIG. 3 is a flow diagram illustrating an exemplary embodiment, in simplified form, of a process for enabling multidimensional search capabilities on a non-PC (personal computer) device being utilized by a user.

FIG. 3 illustrates an exemplary embodiment, in simplified form, of a process for enabling multidimensional search capabilities on a non-PC device being utilized by a user. As exemplified in FIG. 3, the process starts in block 300 with receiving an original query which is submitted by the user via the non-PC device. A structured data repository is then accessed to extract structured data that is available for the original query (block 302). As will be appreciated from the more detailed description that follows, the extracted structured data represents attributes of the original query. Whenever structured data for the original query is extracted from the structured data repository (block 304, Yes), the extracted structured data is then provided to the user in the form of a hierarchical menu which allows the user to interactively modify the original query (block 306). As will be described in more detail hereafter, any such modification performed by the user results in a revised query being generated. The revised query is then submitted to the search service (block 308). Search results for the revised query are then received from the search service (block 310). The search results are then provided to the user via the non-PC device (block 312).

Once the revised query has been generated, the aforementioned action of submitting it to the search service can be implemented in various ways. By way of example but not limitation, in one embodiment of the multidimensional search technique described herein the revised query can simply be submitted to one of the aforementioned general purpose search engines. In another embodiment of the multidimensional search technique a conventional method for integrating specialized knowledge sources into a general search service can be used to select one or more target search engines each of which are determined to have a degree of relevance to the revised query that is higher than a prescribed threshold. As is appreciated in the art of information search, such a method is sometimes referred to as "federated search." Once the target search engines are selected, the revised query is then submitted to each target search engine. It will be appreciated that each target search engine can be either a general purpose search engine, or an expert knowledge search engine that is associated with a specific specialized knowledge source which includes curated data about one or more specific topics. Exemplary specialized knowledge sources have been described heretofore. It will also be appreciated that this particular embodiment of the multidimensional search technique serves to match the revised query to one or more optimally relevant information sources.

Figure 4:
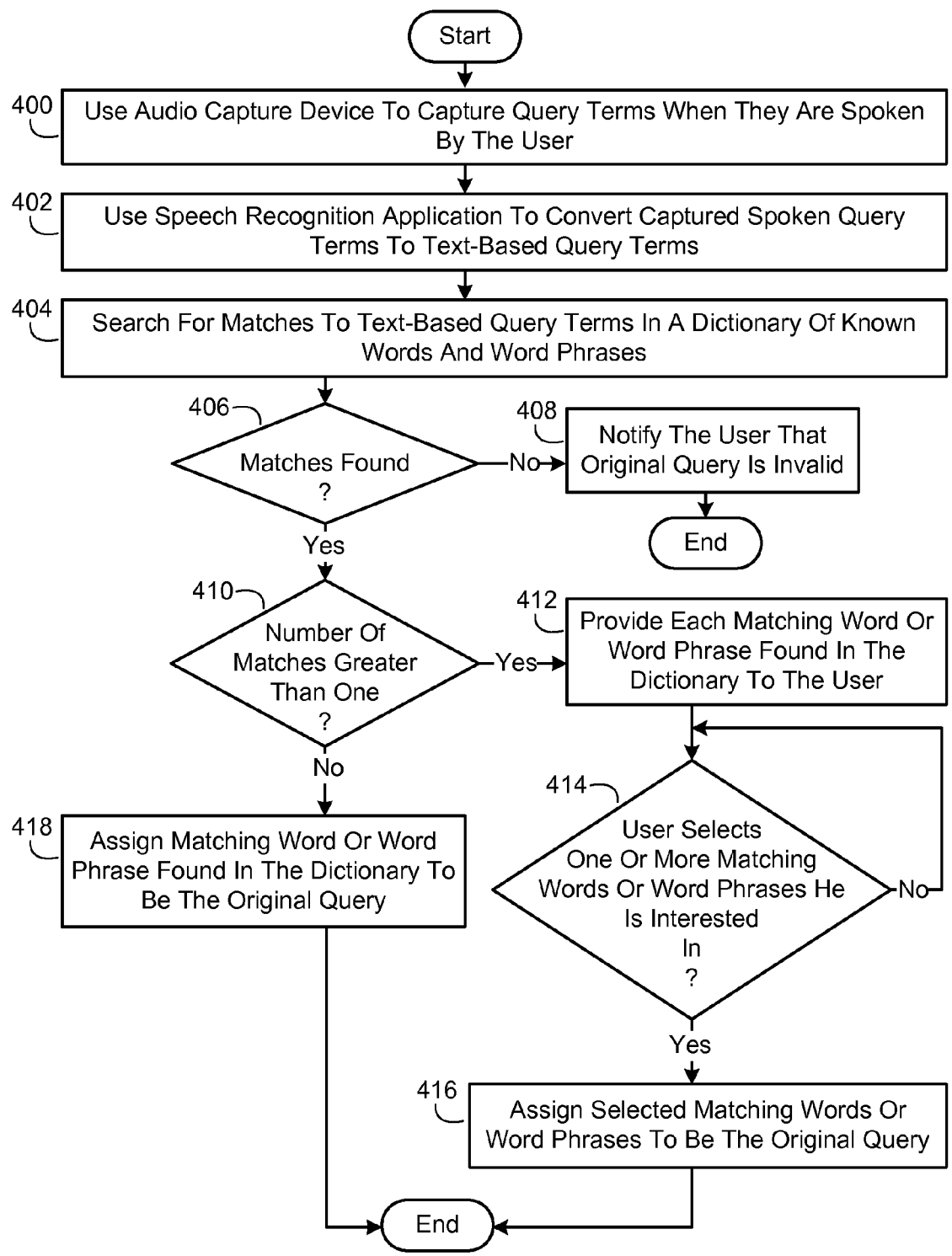
FIG. 4 is a flow diagram illustrating one embodiment, in simplified form, of a process for receiving an original query which is submitted by the user via the non-PC device.

FIG. 4 illustrates one embodiment, in simplified form, of a process for receiving an original query which is submitted by the user via the non-PC device. This particular embodiment applies to the case where the user interface of the non-PC device includes an audio capture device and the user speaks each of the one or more query terms in uninterrupted succession (i.e., the entire original query is spoken by the user at the same time). As exemplified in FIG. 4, the process starts in block 400 with using the audio capture device to capture the query terms when they are spoken by the user. A conventional speech recognition application is then used to convert the captured spoken query terms to text-based query terms (block 402). Matches to the text-based query terms are then searched for in a dictionary of known words and word phrases (block 404). It is noted that a matching method is employed which takes into account any misspellings of the query terms, and also takes into account alternative spellings of the query terms and alternative forms thereof. Whenever no matching words or word phrases are found in the dictionary (block 406, No), the user is notified that the original query is invalid (block 408), at which point the user can choose to resubmit the original query either by re-speaking the query terms, or by typing them into a physical or virtual keyboard if one is included in the user interface. The user can also choose to submit a modified query.

Referring again to FIG. 4, whenever more than one matching word or word phrase is found in the dictionary of known words and word phrases (block 406, Yes and block 410, Yes), each matching word or word phrase found in the dictionary is provided to the user (block 412) and upon the user selecting one or more matching words or word phrases he is interested in (block 414, Yes), the selected matching words or word phrases are assigned to be the original query (block 416). By way of example but not limitation, in the case where the text-based query terms include "george bush" two matches would be found in the dictionary of known words and word phrases, namely "George Bush Jr." and "George Bush Sr.". The user could then select which George Bush he is interested in, or could also select both if he is interested in both. It will be appreciated that the actions of blocks 412, 414 and 416 allow the user to disambiguate the original query. Whenever just one matching word or word phrase is found in the dictionary (block 406, Yes and block 410, No), the one matching word or word phrase found in the dictionary is assigned to be the original query (block 418). It is appreciated that in situations where the user is in an environment having any significant amount of background noise, this noise can make it difficult for the aforementioned speech recognition application to accurately interpret the query terms being spoken by the user. The process exemplified in FIG. 4 is advantageous in such noisy situations since the use of a dictionary of known words and words phrases optimizes the ability of the speech recognition application to accurately interpret the query terms being spoken by the user.

Figure 9:
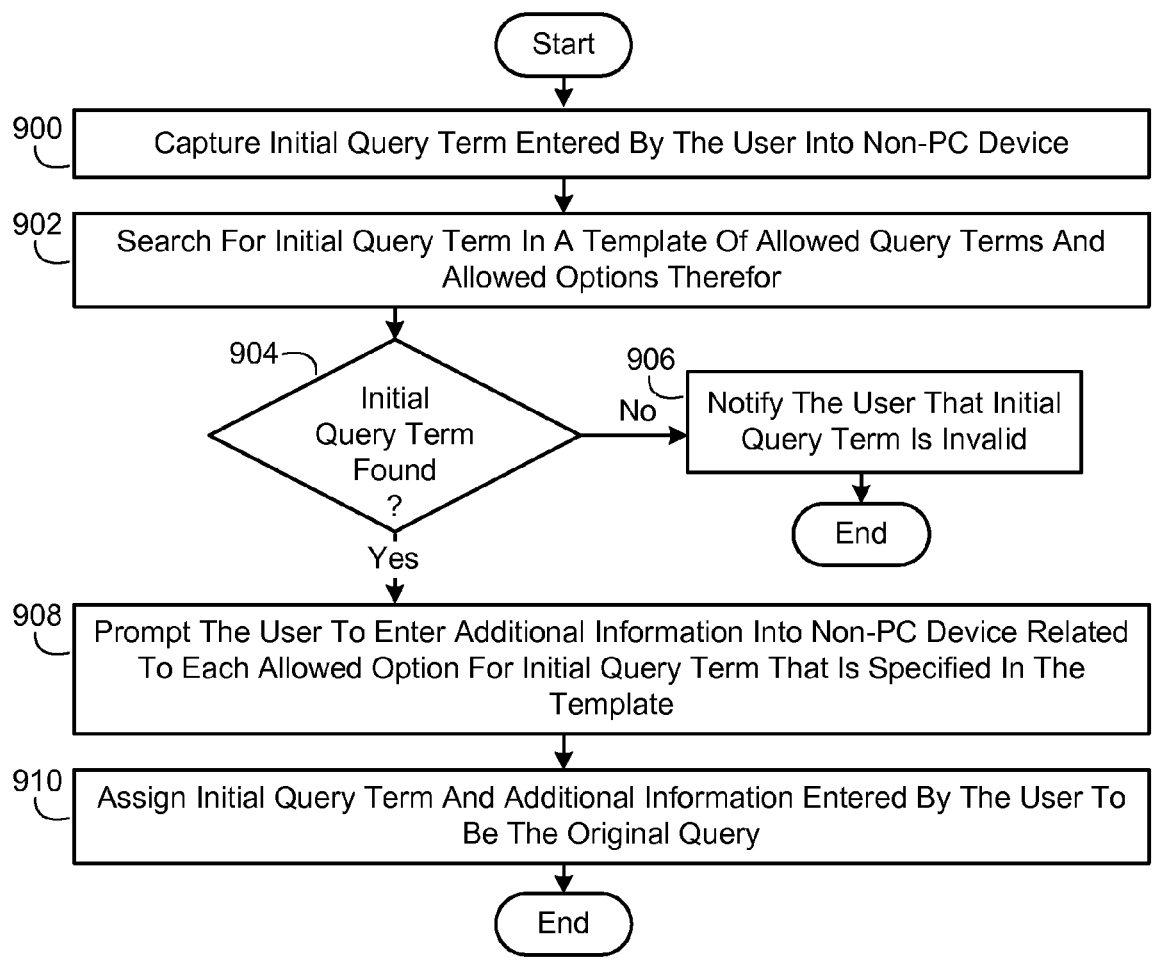
FIG. 9 is a flow diagram illustrating another embodiment, in simplified form, of a process for receiving an original query which is submitted by the user via the non-PC device.

FIG. 9 illustrates another embodiment, in simplified form, of a process for receiving an original query which is submitted by the user via the non-PC device. This particular embodiment applies to the case where the user initially enters just a single query term and then waits to be prompted by the non-PC device before entering any additional information related to the query. As exemplified in FIG. 9, the process starts in block 900 with capturing an initial query term which is entered by the user into the non-PC device. The initial query term is then searched for in a template of allowed query terms and allowed options therefor (block 902). Whenever the initial query term is not found in the template (block 904, No), the user is notified that the initial query term is invalid (block 906), at which point the user can choose to either re-enter the initial query term using an input device which is different than the input device he previously used to enter the initial query term, or enter a different initial query term. Whenever the initial query term is found in the template (block 904, Yes), the user is prompted to enter additional information into the non-PC device related to each allowed option for the initial query term that is specified in the template (block 908). The initial query term and the additional information that is entered by the user is then assigned to be the original query (block 910). By way of example but not limitation, assume that the template includes the query term "president" and the allowed options for this query term are "country" and "year". Given that the user enters "president" as the initial query term, the user would then be prompted to enter a country he is interested in, and would then be prompted to enter a year he is interested in. The query term "president" along with the country and year information entered by the user would then be assigned to be the original query.

Figure 5:
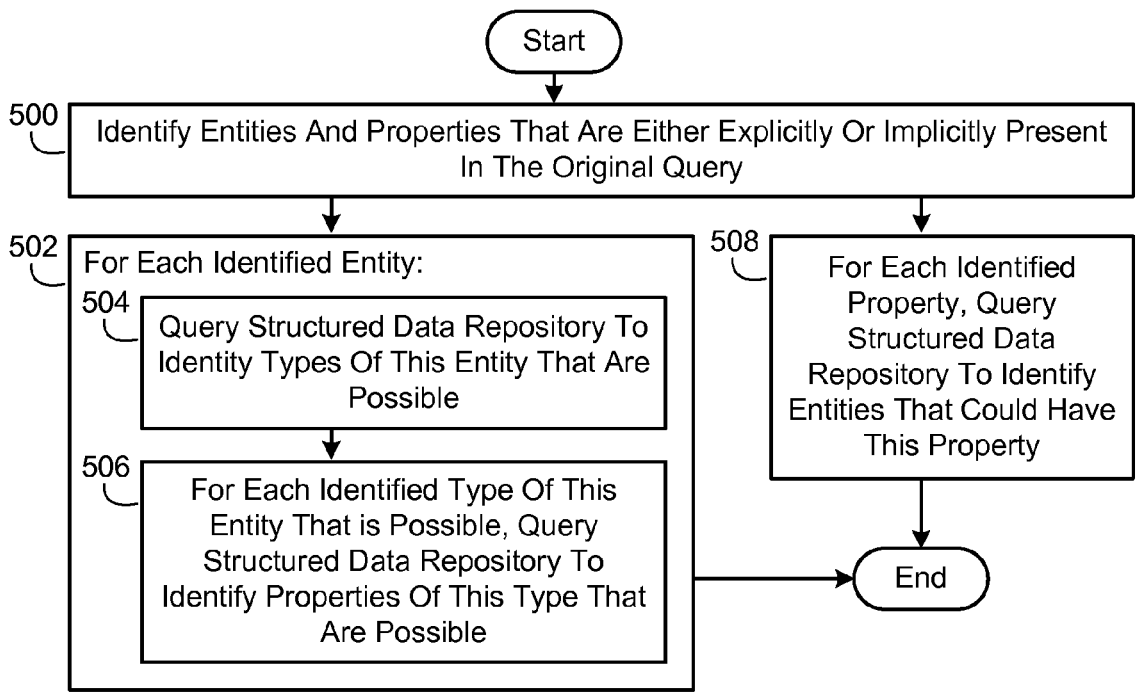
FIG. 5 is a flow diagram illustrating an exemplary embodiment, in simplified form, of a process for accessing a structured data repository to extract structured data that is available for the original query.

FIG. 5 illustrates an exemplary embodiment, in simplified form, of a process for accessing the structured data repository to extract structured data that is available for the original query. As exemplified in FIG. 5, the process starts in block 500 with identifying entities and properties that are either explicitly or implicitly present in the original query. The term "entity" is used herein to refer to a noun. The term "property" is used herein to refer to an attribute (e.g., a facet) of an entity. By way of example but not limitation, given that the original query includes the query terms "george washington birthplace," the query terms "george washington" would be identified to be an entity and the query term "birthplace" would be identified to be a property. In an exemplary embodiment of the multidimensional search technique described herein the entities and properties that are present in the original query are identified in the following manner. A conventional set of grammar rules is used to parse the original query and match the query terms therein against a set of existing dictionaries that are maintained by the grammar rules. In other words, the grammar rules parse the original query and trigger on (e.g., identify) grammar patterns in the query terms using existing grammar templates that have previously been created. It will be appreciated that these grammar templates can be initially created by one or more information domain experts, and then can be augmented and expanded by mining query logs from one or more search services.

Referring again to FIG. 5, once the entities and properties that are either explicitly or implicitly present in the original query have been identified (block 500), the following actions take place. For each entity that is identified to be present in the original query (hereafter simply referred to as an "identified entity") (block 502), the structured data repository is queried to identify types of this entity that are possible (block 504), and then for each identified type of this entity that is possible, the structured data repository is queried to identify properties of this type that are possible (block 506). For each property that is identified to be present in the original query (hereafter simply referred to as an "identified property"), the structured data repository is queried to identify entities that could have this property (block 508).

Figure 6:
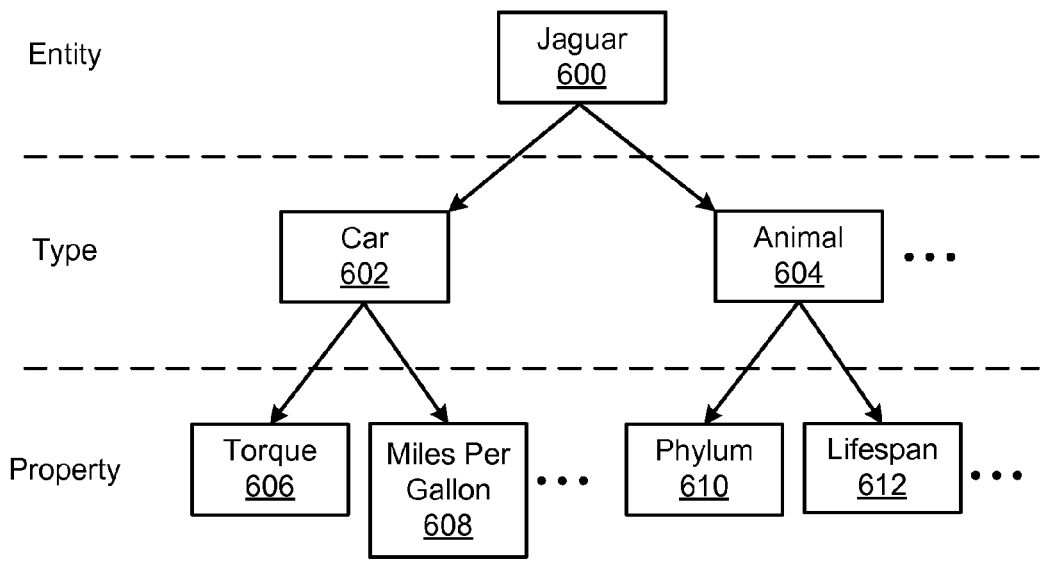
FIG. 6 is a diagram illustrating an exemplary embodiment, in simplified form, of structured data that is extracted from the structured data repository in an exemplary case where the original query explicitly includes the query term "jaguar".

FIG. 6 illustrates an exemplary embodiment, in simplified form, of structured data that is extracted from the structured data repository in an exemplary case where the original query explicitly includes the query term "jaguar". As exemplified in FIG. 6, in this particular case "jaguar" 600 is identified to be an entity. Types of this entity that are identified via the structured data repository to be possible include a "car" 602 and an "animal" 604, among others. Properties of a "jaguar car" that are identified via the structured data repository to be possible include "torque" 606 and "miles per gallon" 608, among others. Properties of a "jaguar animal" that are identified via the structured data repository to be possible include "phylum" 610 and "lifespan" 612, among others.

Figure 7:
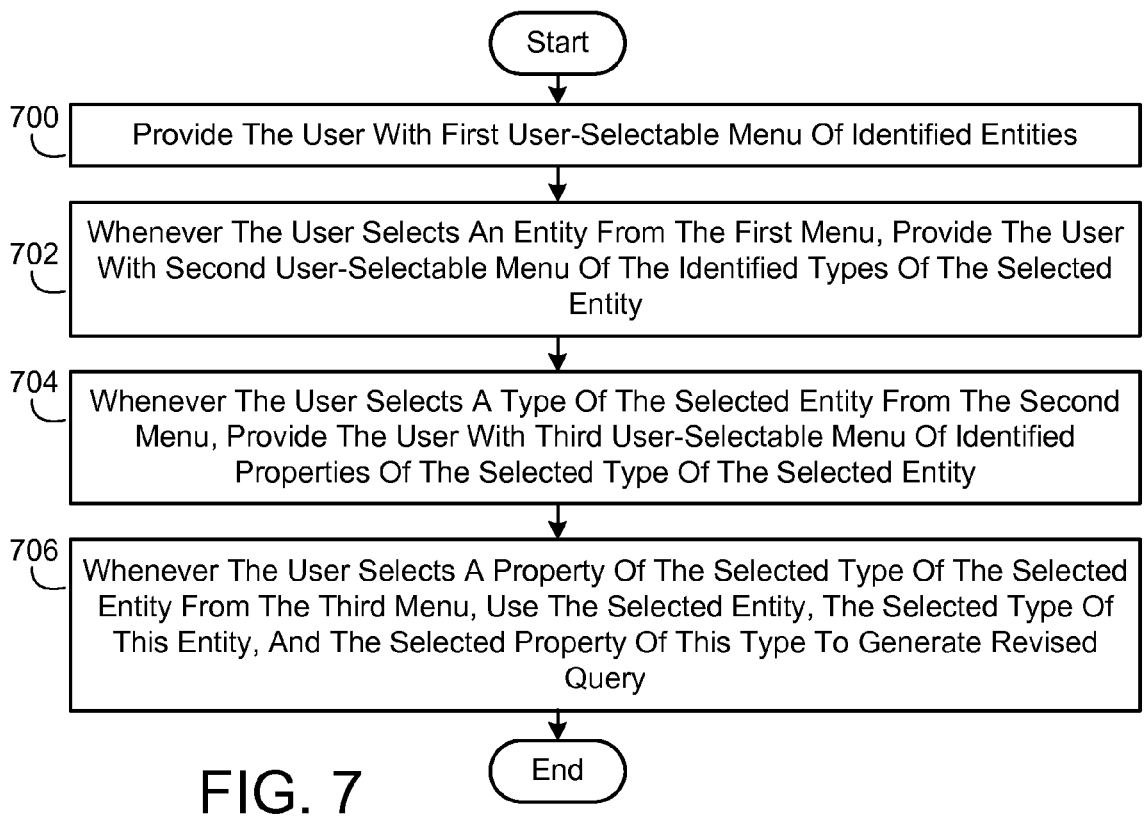
FIG. 7 is a flow diagram illustrating an exemplary embodiment, in simplified form, of a process for providing the extracted structured data to the user in the form of a hierarchical menu which allows the user to interactively modify the original query whenever one or more entities are identified to be either implicitly or explicitly present in the original query.

FIG. 7 illustrates an exemplary embodiment, in simplified form, of a process for providing the extracted structured data to the user in the form of a hierarchical menu which allows the user to interactively modify the original query whenever one or more entities are identified to be either implicitly or explicitly present in the original query. As exemplified in FIG. 7, the process starts in block 700 with providing the user with a first user-selectable menu of the identified entities. Then, whenever the user selects an entity from the first user-selectable menu, the user is provided with a second user-selectable menu of the identified types of the selected entity (block 702). Then, whenever the user selects a type of the selected entity from the second user-selectable menu, the user is provided with a third user-selectable menu of the identified properties of the selected type of the selected entity (block 704). Then, whenever the user selects a property of the selected type of the selected entity from the third user-selectable menu, the selected entity, the selected type of this entity, and the selected property of this type are used to generate the revised query (block 706).

Figure 8:
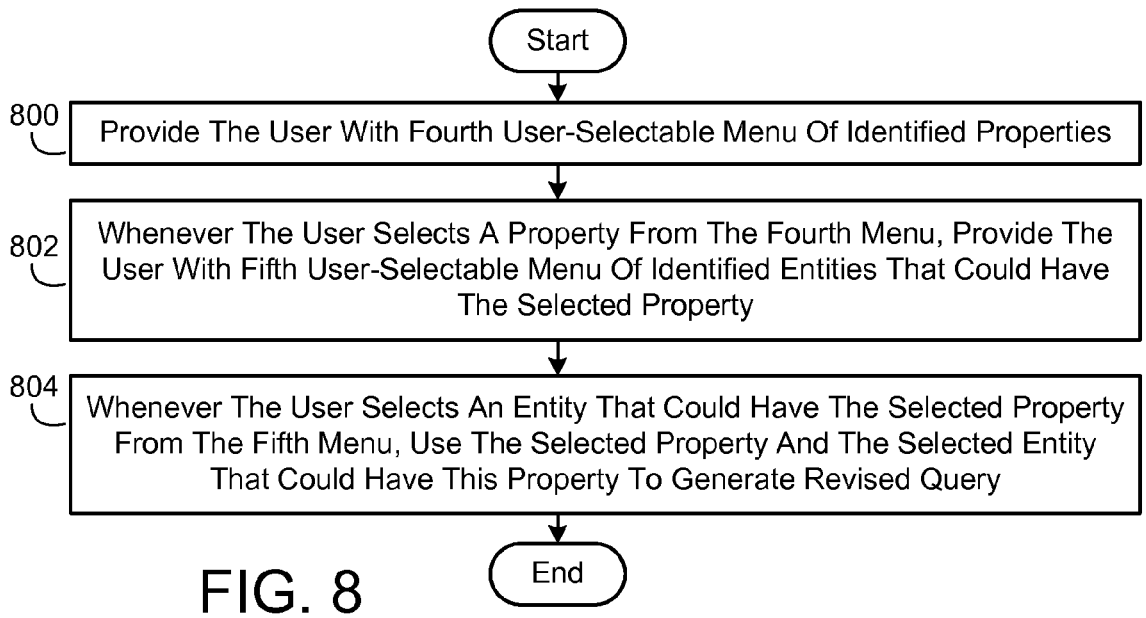
FIG. 8 is a flow diagram illustrating an exemplary embodiment, in simplified form, of a process for providing the extracted structured data to the user in the form of a hierarchical menu which allows the user to interactively modify the original query whenever one or more properties are identified to be either implicitly or explicitly present in the original query.

FIG. 8 illustrates an exemplary embodiment, in simplified form, of a process for providing the extracted structured data to the user in the form of a hierarchical menu which allows the user to interactively modify the original query whenever one or more properties are identified to be either implicitly or explicitly present in the original query. As exemplified in FIG. 8, the process starts in block 800 with providing the user with a fourth user-selectable menu of the identified properties. Then, whenever the user selects a property from the fourth user-selectable menu, the user is provided with a fifth user-selectable menu of the identified entities that could have the selected property (block 802). Then, whenever the user selects an entity that could have the selected property from the fifth user-selectable menu, the selected property and the selected entity that could have this property are used to generate the revised query (block 804).

The processes exemplified in FIGS. 7 and 8 generally allow the user to interact with the structured data that is extracted from the structured data repository in order to refine and further disambiguate the original query. For clarification, an example will now be provided using the aforementioned case where "jaguar" is an entity that is identified to be present in the original query. In this case, the user would be provided with a first user-selectable menu that includes the entity "jaguar". Upon the user selecting "jaguar" from the first menu, the user is provided with a second user-selectable menu that includes the types "car" and "animal". Upon the user selecting "animal" from the second menu, the user is provided with a third user-selectable menu that includes the properties "phylum" and "lifespan". Upon the user selecting "lifespan" from the third menu, a revised query is generated that includes the query terms "jaguar animal lifespan".

Generally speaking, each of the user-selectable menus that have just been described include an "EXIT" option which the user can select to indicate that he is finished making selections. More particularly, whenever the user selects the "EXIT" option in either the first or fourth user-selectable menus, the original query will be assigned to be the revised query. Whenever the user selects the "EXIT" option in either the second, or third, or fifth user-selectable menus, the selections the user has made up until this point will be used to generate the revised query.

In an exemplary embodiment of the multidimensional search technique described herein the structured data that is extracted from the structured data repository (e.g., each identified entity, each identified type of each identified entity, each identified property of each identified type of each identified entity, each identified property, and each identified entity that could have each identified property) is provided to the user by displaying a plurality of graphical elements on the non-PC device's display device. Each graphical element represents a different item of extracted structured data (e.g., each graphical element represents either an entity, or a type, or a property of a selected type of a selected entity, or a property, or an entity that could have a selected property), and each graphical element is labeled to identify the particular item of extracted structured data it represents. Each graphical element can be implemented as either a button or an icon (among other things).

The user can interact with the extracted structured data in various ways in order to modify (e.g., disambiguate and refine) the original query. The particular way(s) in which this user interaction can occur depend upon the particular types of input and output devices that are included in the non-PC device being utilized by the user. In one embodiment of the multidimensional search technique described herein where the non-PC device includes a display device having a touch-sensitive display screen, the user can select the particular items of extracted structured data he is interested in to modify the original query as follows. Whenever the user utilizes a pointing device to physically contact (i.e., select) one or more of the graphical elements which are displayed on the display screen, the item of extracted structured data represented by each physically contacted graphical element will be used to generate the revised query. It will be appreciated that the pointing device can be either a pen, or one or more of the user's fingers, or the like. In another embodiment of the multidimensional search technique where the non-PC device includes the aforementioned handheld 3D remote controller device, the user can select the particular items of extracted structured data he is interested in to modify the original query as follows. Whenever the user utilizes the remote controller device to virtually point to and select one or more of the graphical elements which are displayed on the display device, the item of extracted structured data represented by each selected graphical element will be used to generate the revised query. In yet another embodiment of the multidimensional search technique where the non-PC device includes the aforementioned 3D gesture-sensing device, the user can select the particular items of extracted structured data he is interested in to modify the original query as follows. Whenever the user gestures with his hand to virtually "grab" one or more of the graphical elements which are displayed on the displayed device, the item of extracted structured data represented by each grabbed graphical element will be used to generate the revised query.

3.0 Additional Embodiments

While the multidimensional search technique has been described by specific reference to embodiments thereof, it is understood that variations and modifications thereof can be made without departing from the true spirit and scope of the multidimensional search technique. By way of example but not limitation, rather than the extracted structured data being provided to the user in the form of a hierarchical menu, in the case where the user interface of the non-PC device includes a 3D display device and a 3D gesture-sensing device, the extracted structured data can be provided to the user in the form of various information pivots which are displayed along different dimensions of the display device. Whenever the user selects one or more particular items of extracted structured data that are displayed along one or more of the pivots, the information contents of the pivots is updated based on the user's selection. For clarification, an example will now be provided using a case where "travel" is an entity that is identified to be present in the user's original query. In this case, one of the pivots would include the entity "travel". Upon the user gesturing to select "travel" from this pivot, the information contents of the pivots might be updated as follows. Possible themes (such as parks, beaches, mountains, and the like) could be displayed along a first dimension of the display device. Possible continents (such as North America, South America, Africa, and the like) could be displayed along a second dimension of the display device. Possible cost ranges (such as less than $100, less than $1000, less than $5000, and the like) could be displayed along a third dimension of the display device. Upon the user gesturing to select "beaches", the information contents of the pivots would be updated based on this selection.

It is also noted that any or all of the aforementioned embodiments can be used in any combination desired to form additional hybrid embodiments. Although the multidimensional search technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

Figure 10:
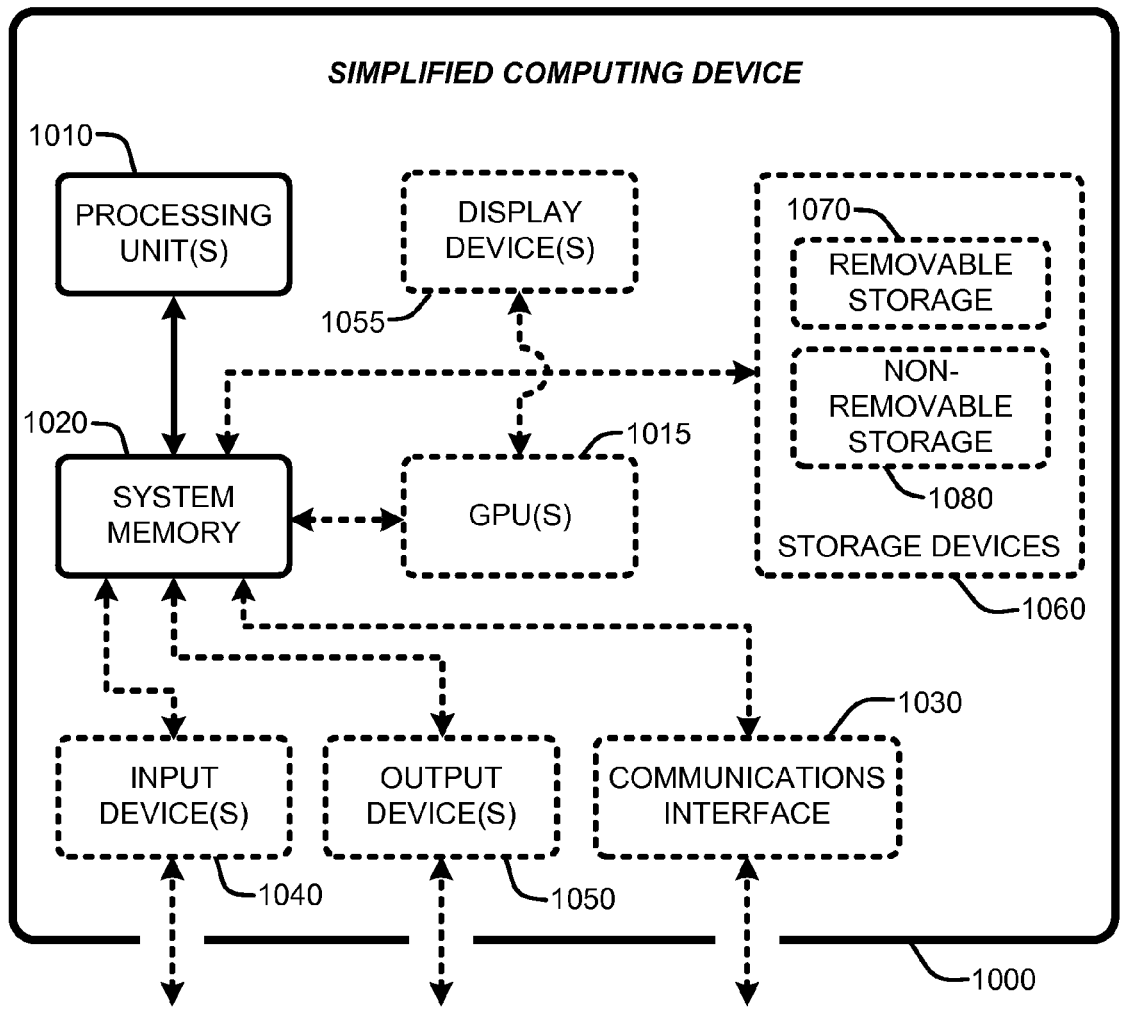
FIG. 10 is a diagram illustrating a simplified example of a general-purpose computer system on which various embodiments and elements of the multidimensional search technique embodiments, as described herein, may be implemented.

The multidimensional search technique embodiments described herein are operational within numerous types of general purpose or special purpose computing system environments or configurations. FIG. 10 illustrates a simplified example of a general-purpose computer system on which various embodiments and elements of the multidimensional search technique embodiments, as described herein, may be implemented. It should be noted that any boxes that are represented by broken or dashed lines in FIG. 10 represent alternate embodiments of the simplified computing device, and that any or all of these alternate embodiments, as described below, may be used in combination with other alternate embodiments that are described throughout this document.

For example, FIG. 10 shows a general system diagram showing a simplified computing device 1000. Such computing devices can be typically be found in devices having at least some minimum computational capability, including, but not limited to, personal computers (PCs), server computers, handheld computing devices, laptop or mobile computers, communications devices such as cell phones and personal digital assistant (PDA) devices, multiprocessor systems, microprocessor-based systems, set top boxes, programmable consumer electronics, network PCs, minicomputers, mainframe computers, and audio or video media players.

To allow a device to implement the multidimensional search technique embodiments described herein, the device should have a sufficient computational capability and system memory to enable basic computational operations. In particular, as illustrated by FIG. 10, the computational capability is generally illustrated by one or more processing unit(s) 1010, and may also include one or more graphics processing units (GPUs) 1015, either or both in communication with system memory 1020. Note that that the processing unit(s) 1010 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device of FIG. 10 may also include other components, such as, for example, a communications interface 1030. The simplified computing device of FIG. 10 may also include one or more conventional computer input devices 1040 (e.g., pointing devices, keyboards, audio input devices, video input devices, haptic input devices, devices for receiving wired or wireless data transmissions, and the like). The simplified computing device of FIG. 10 may also include other optional components, such as, for example, one or more conventional computer output devices 1050 (e.g., display device(s) 1055, audio output devices, video output devices, devices for transmitting wired or wireless data transmissions, and the like). Note that typical communications interfaces 1030, input devices 1040, output devices 1050, and storage devices 1060 for general-purpose computers are well known to those skilled in the art, and will not be described in detail herein.

The simplified computing device of FIG. 10 may also include a variety of computer readable media. Computer readable media can be any available media that can be accessed by computer 1000 via storage devices 1060, and includes both volatile and nonvolatile media that is either removable 1070 and/or non-removable 1080, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the multidimensional search technique described herein, or portions thereof, may be stored, received, transmitted, or read from any desired combination of computer or machine readable media or storage devices and communication media in the form of computer executable instructions or other data structures.

Finally, the multidimensional search technique embodiments described herein may be further described in the general context of computer-executable instructions, such as program modules, being executed by a computing device. Generally, program modules include routines, programs, objects, components, data structures, and the like, that perform particular tasks or implement particular abstract data types. The multidimensional search technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for enabling multidimensional search capabilities on a computing device, other than a desktop personal computer or a laptop computer, being utilized by a user, comprising:
   using said computing device to perform the following process actions:
   receiving an original query submitted by the user via the computing device;
   accessing a structured data repository to extract structured data that is available for the original query, wherein the extracted structured data represents attributes of the original query;
   providing the extracted structured data to the user in the form of a hierarchical menu which allows the user to interactively modify the original query by selecting at least one item from the hierarchical menu, such modification resulting in a revised query;
   submitting the revised query to a search service;
   receiving search results for the revised query from the search service; and
   providing the search results to the user via the computing device.

2. The process of claim 1, wherein the original query comprises one or more query terms, the computing device comprises an audio capture device, and the process action of receiving an original query submitted by the user via the computing device comprises the actions of:
   using the audio capture device to capture the query terms when they are spoken by the user;
   using a speech recognition application to convert the captured query terms to text-based query terms;
   searching for matches to the text-based query terms in a dictionary of known words and word phrases;

whenever no matching words or word phrases are found in the dictionary, notifying the user that the original query is invalid;

whenever more than one matching word or word phrase is found in the dictionary, provide each matching word or word phrase found in the dictionary to the user, and whenever the user selects one or more matching words or word phrases he is interested in, assigning the selected matching words or word phrases to be the original query; and whenever just one matching word or word phrase is found in the dictionary, assigning the one matching word or word phrase to be the original query.

3. The process of claim 1, wherein the process action of receiving an original query submitted by the user via the computing device comprises the actions of:

capturing an initial query term which is entered by the user into the computing device;

searching for the initial query term in a template of allowed query terms and allowed options therefor;

whenever the initial query term is not found in the template, notifying the user that the initial query term is invalid;

whenever the initial query term is found in the template, prompting the user to enter additional information into the computing device related to each allowed option for the initial query term that is specified in the template; and assigning the initial query term and additional information entered by the user to be the original query.

4. The process of claim 1, wherein the process action of accessing a structured data repository to extract structured data that is available for the original query comprises the actions of:

identifying entities and properties that are either explicitly or implicitly present in the original query;

for each identified entity, querying the structured data repository to identify types of said entity that are possible, and for each identified type of said entity that is possible, querying the structured data repository to identify properties of said type that are possible; and for each identified property, querying the structured data repository to identify entities that could have said property.

5. The process of claim 4, wherein whenever one or more entities are identified to be either explicitly or implicitly present in the original query, the process action of providing the extracted structured data to the user in the form of a hierarchical menu which allows the user to interactively modify the original query comprises the actions of:

providing the user with a first user-selectable menu of the identified entities;

whenever the user selects an entity from the first user-selectable menu, providing the user with a second user-selectable menu of the identified types of the selected entity;

whenever the user selects a type of the selected entity from the second user-selectable menu, providing the user with a third user-selectable menu of the identified properties of the selected type of the selected entity; and whenever the user selects a property of the selected type of the selected entity from the third user-selectable menu, using the selected entity, the selected type of said entity, and the selected property of said type to generate the revised query.

6. The process of claim 4, wherein whenever one or more properties are identified to be either explicitly or implicitly present in the original query, the process action of providing the extracted structured data to the user in the form of a hierarchical menu which allows the user to interactively modify the original query comprises the actions of:

providing the user with a first user-selectable menu of the identified properties;

whenever the user selects a property from the first user-selectable menu, providing the user with a second user-selectable menu of the identified entities that could have the selected property; and whenever the user selects an entity that could have the selected property from the second user-selectable menu, using the selected property and the selected entity that could have said property to generate the revised query.

7. The process of claim 4, wherein the original query comprises one or more query terms, and the process action of identifying entities and properties that are either explicitly or implicitly present in the original query comprises an action of using a set of grammar rules to parse the original query and match the query terms against a set of dictionaries that are maintained by the grammar rules.

8. The process of claim 1, wherein the process action of submitting the revised query to a search service comprises the actions of:

using a method for integrating specialized knowledge sources into a general search service to select one or more target search engines each of which are determined to have a degree of relevance to the revised query that is higher than a prescribed threshold; and submitting the revised query to each target search engine.

9. The process of claim 8, wherein each target search engine comprises either a general purpose search engine, or an expert knowledge search engine that is associated with a specific specialized knowledge source which includes curated data about one or more specific topics.

10. The process of claim 1, wherein the process action of submitting the revised query to a search service comprises an action of submitting the revised query to a general purpose search engine.

11. The process of claim 1, wherein the computing device comprises either a smartphone, or a tablet computer, or a personal digital assistant device, or a three-dimensional television system, or a three-dimensional heads-up display system, or a video game console.

12. The process of claim 1, wherein the structured data repository is constructed by crawling one or more prescribed websites.

13. The process of claim 1, wherein the structured data repository comprises one or more online knowledge bases in which data is already organized in a structured manner.

14. The process of claim 1, wherein the computing device comprises a display device and a handheld three-dimensional remote controller device, and the process action of providing the extracted structured data to the user in the form of a hierarchical menu which allows the user to interactively modify the original query comprises the actions of:

displaying a plurality of graphical elements on the display device, wherein each graphical element represents a different item of extracted structured data and is labeled to identify said item; and whenever the user utilizes the remote controller device to virtually point to and select one or more of the graphical elements, using the item of extracted structured data represented by each selected graphical element to generate the revised query.

15. The process of claim 1, wherein the computing device comprises a display device and a three-dimensional gesture-sensing device, and the process action of providing the extracted structured data to the user in the form of a hierarchical menu which allows the user to interactively modify the original query comprises the actions of:
  displaying a plurality of graphical elements on the display device, wherein each graphical element represents a different item of extracted structured data and is labeled to identify said item; and
  whenever the user gestures with his hand to virtually grab one or more of the graphical elements, using the item of extracted structured data represented by each grabbed graphical element to generate the revised query.

16. A system for allowing a user to submit queries to a search service for particular online information he is interested in, comprising:
  a computing device; and
  a computer program having program modules executable by the computing device, wherein the computing device is directed by the program modules of the computer program to,
    receive an original query submitted by the user via the computing device,
    access a structured data repository to extract structured data that is available for the original query, wherein the extracted structured data represents attributes of the original query,
    provide the extracted structured data to the user in the form of a hierarchical menu which allows the user to interactively modify the original query by selecting at least one item from the hierarchical menu, such modification resulting in a revised query,
    submit the revised query to the search service,
    receive search results for the revised query from the search service, and
    provide the search results to the user.

17. The system of claim 16, wherein the program module for accessing a structured data repository to extract structured data that is available for the original query comprises program modules for:
  identifying entities and properties that are either explicitly or implicitly present in the original query;
  for each identified entity,
    querying the structured data repository to identify types of said entity that are possible, and
    for each identified type of said entity that is possible, querying the structured data repository to identify properties of said type that are possible; and
  for each identified property, querying the structured data repository to identify entities that could have said property.

18. A computer-implemented process for enabling multi-dimensional search capabilities on computing device, other than a desktop personal computer or a laptop computer, being utilized by a user, comprising:
  using said computing device to perform the following process actions:
  receiving an original query submitted by the user via the computing device, wherein the computing device comprises an audio capture device, and said receiving comprising the actions of,
    using the audio capture device to capture one or more query terms which are spoken by the user,
    using a speech recognition application to convert the captured query terms to text-based query terms,
    searching for matches to the text-based query terms in a dictionary of known words and word phrases,
    whenever more than one matching word or word phrase is found in the dictionary, providing each matching word or word phrase found in the dictionary to the user, and assigning the matching words or word phrases which are selected by the user to be the original query, and
    whenever just one matching word or word phrase is found in the dictionary, assigning the one matching word or word phrase to be the original query;
  identifying entities and properties that are either explicitly or implicitly present in the original query;
  for each identified entity, querying a structured data repository to identify types of said entity that are possible, and for each identified type of said entity that is possible, querying the structured data repository to identify properties of said type that are possible;
  for each identified property, querying the structured data repository to identify entities that could have said property;
  providing the identified entities, the identified types of each identified entity, the identified properties of each identified type of each identified entity, the identified properties, and the identified entities that could have each identified property to the user in the form of a hierarchical menu which allows the user to interactively modify the original query by selecting at least one item from the hierarchical menu, such modification resulting in a revised query;
  using a method for integrating specialized knowledge sources into a general search service to select one or more target search engines each of which are determined to have a degree of relevance to the revised query that is higher than a prescribed threshold;
  submitting the revised query to each target search engine;
  receiving search results for the revised query from each target search engine; and
  providing the search results to the user via the computing device.

* * * * *